(12) United States Patent
Callerame

(10) Patent No.: US 7,842,195 B2
(45) Date of Patent: Nov. 30, 2010

(54) CLATHRATE OF CHLORINE DIOXIDE

(76) Inventor: Joseph Callerame, 2220 Casper Dr., Havasu City, AZ (US) 86405

( * ) Notice: Subject to any disclaimer, the term of this patent is extended or adjusted under 35 U.S.C. 154(b) by 559 days.

(21) Appl. No.: 11/772,657

(22) Filed: Jul. 2, 2007

(65) Prior Publication Data

US 2008/0023668 A1    Jan. 31, 2008

Related U.S. Application Data

(63) Continuation-in-part of application No. 10/887,128, filed on Jul. 8, 2004, now abandoned.

(51) Int. Cl.
C01B 11/02 (2006.01)
C01B 7/00 (2006.01)
A01N 25/34 (2006.01)
A01N 25/10 (2006.01)
A01N 25/08 (2006.01)
A01N 25/06 (2006.01)

(52) U.S. Cl. ............... 252/186.36; 252/186.25; 252/187.21; 204/157.48; 424/405; 424/408; 424/409; 424/417; 424/661

(58) Field of Classification Search ............ 252/186.26, 252/187.21; 424/408, 409
See application file for complete search history.

(56) References Cited

U.S. PATENT DOCUMENTS

| | | | | |
|---|---|---|---|---|
| 4,689,215 A | * | 8/1987 | Ratcliff | 424/53 |
| 4,696,811 A | * | 9/1987 | Ratcliff | 424/53 |
| 6,358,935 B1 | * | 3/2002 | Beck et al. | 514/58 |
| 6,451,253 B1 | * | 9/2002 | Pitochelli et al. | 422/29 |
| 6,660,823 B1 | * | 12/2003 | Lichtenhan et al. | 528/37 |
| 7,337,612 B2 | * | 3/2008 | Skinnes et al. | 60/651 |
| 2002/0076449 A1 | * | 6/2002 | Beck et al. | 424/661 |
| 2002/0198174 A1 | * | 12/2002 | Lyons | 514/58 |
| 2004/0175435 A1 | * | 9/2004 | Beck et al. | 424/661 |
| 2005/0004074 A1 | * | 1/2005 | Lyons et al. | 514/58 |
| 2005/0161631 A1 | * | 7/2005 | Walker et al. | 252/70 |
| 2005/0164986 A1 | * | 7/2005 | Mosher et al. | 514/58 |
| 2006/0006361 A1 | * | 1/2006 | Callerame | 252/182.11 |
| 2007/0281929 A1 | * | 12/2007 | Amanokura et al. | 514/229.2 |
| 2008/0023668 A1 | * | 1/2008 | Callerame | 252/182.11 |
| 2009/0053326 A1 | * | 2/2009 | Harrison | 424/661 |
| 2009/0054375 A1 | * | 2/2009 | Harrison et al. | 514/58 |

OTHER PUBLICATIONS

Abstract of WO 03/019549 A1, Inventor: Skinnes et al., (Nov. 2003).*

* cited by examiner

*Primary Examiner*—Joseph D Anthony
(74) *Attorney, Agent, or Firm*—Miller Canfield Paddock and Stone, P.L.C.; Timothy J. Engling

(57) ABSTRACT

Methods and compositions to a clathrate that includes chlorine dioxide ($ClO_2$) are provided. Clathrates trap gaseous chlorine dioxide to provide a dry solid material that is stable and easy to use and handle. Stable formulations of gaseous chlorine dioxide are useful as disinfectants.

10 Claims, No Drawings

CLATHRATE OF CHLORINE DIOXIDE

This application is a continuation-in-part of co-pending U.S. Ser. No. 10/887,128 filed Jul. 8, 2004.

The present disclosure relates to stable formulations of clathrates that include gaseous chlorine dioxide and methods for their production and use.

BACKGROUND

Chlorine dioxide is of considerable industrial importance and has found use as a disinfectant and in the bleaching of wood pulp, fats, oils and flour, and more recently for the sterilization of anthrax. Generally, chlorine dioxide is used as a bleaching agent and for removing tastes and odors from water and other liquids. More recently, it has been used as an anti-pollutant for disinfecting drinking water.

For several of the established uses of chlorine dioxide, it is desirable to produce the gas in situ so that the chlorine dioxide, upon formation, can be directly put to use either in gaseous form or, after absorption, in the form of an aqueous solution. In many instances, the use of chlorine dioxide solution rather than in the gaseous form is preferred. Chlorine dioxide is absorbed in water and forms chlorous acid, from which the gas can be readily expelled by heating. The presence of chlorous acid in an aqueous solution indicates a reaction of chlorine dioxide with water.

Several processes have previously been proposed for producing chlorine dioxide. U.S. Pat. Nos. 3,648,437, 3,695,839, 3,828,097, 4,877,500, 4,874,489 and 3,754,079, are directed to the production of chlorine dioxide or chlorous acid from which the chlorine dioxide can be expelled.

SUMMARY

The present disclosure relates to stable clathrate formulations that include $ClO_2$. The clathrates are effective for entrapping $ClO_2$ to provide a composition that includes a dry solid material. The clathrates containing the $ClO_2$ release $ClO_2$ when the clathrates are contacted with water, heated in excess of about 37° C., ground up or exposed to a combination of heat and moisture. The clathrates containing chlorine dioxide are stable in that they retain the gaseous $ClO_2$ for a significant period and that the $ClO_2$ remain in a gaseous form during storage. Gaseous form of $ClO_2$ is highly reactive.

The solid clathrate material allows for ease of handling of $ClO_2$ without requiring generation equipment at the site of use or a gas under compression that is unstable. In one aspect, the clathrate includes an amount of $ClO_2$ that will provide an amount of $ClO_2$ effective for disinfecting the medium in which it is used. This amount may vary depending upon the type of medium to be disinfected and the amount of organic load (biomass) to be disinfected. Generally, the clathrate includes at least about 0.1 weight percent $ClO_2$ and in an aspect, from about 0.1 to about 10 weight percent $ClO_2$, preferably about 0.4 to about 3 weight percent $ClO_2$ based on the weight of the clathrate.

In an aspect, a $ClO_2$-clathrate is formed as a result of dry blending of a suitable clathrating compound such as, for example, monosaccharides, disaccharides, polysaccharides and mixtures thereof and $ClO_2$. $ClO_2$-clathrates are also formed as a result of dry blending of a suitable clathrating compound with one or more sources of $ClO_2$, such as for example sodium chlorite and an organic acid.

During formation of the clathrate, the reaction mixture is free of water such that less than about 0.5 weight percent water, preferably less than about 0.1 weight percent water, is present in the reaction mixture. In this aspect, the clathrate includes at least about 9 weight percent monosaccharide and in another aspect, from about 9 to about 74.5 weight percent monosaccharide, preferably about 20 to about 70 weight percent monosaccharide, based on the weight of the clathrate. The clathrate further includes at least about 25 weight percent organic acids and in an another aspect, from about 25 to about 80 weight percent organic acids, preferably about 31 to about 80 weight percent organic acid, based on the weight of the clathrate.

The present disclosure is further directed to a method for forming a clathrate of $ClO_2$ from a $ClO_2$ source such as $NaClO_2$. In accordance with the method, at least about 25 weight percent organic acids, based on the weight of the clathrate, is blended with a saccharide to form an organic acid/saccharide blend. The organic acid/saccharide blend is contacted with a source of $ClO_2$ to provide a clathrate of $ClO_2$ (hereinafter "$ClO_2$-clathrate"). The source of $ClO_2$ may be in the form of a salt of $ClO_2$ or other suitable forms. The method is effective for providing a clathrate that includes at least about 9 weight percent saccharide, based on the weight of the clathrate, and in an important aspect, from about 9 to about 74.5 weight percent saccharide, based on the weight of the clathrate. In this aspect, the methods disclosed herein provide a clathrate that includes at least about 0.1 weight % $ClO_2$, based on the weight of the clathrate, and in an another aspect, from about 0.4 to about 10 weight % $ClO_2$, based on the weight of the clathrate.

The clathrate of the disclosure may be utilized as a biocide, for the disinfection or treatment of water, as a bleaching agent, or as an oxidizing agent. In one aspect of the disclosure, a clathrate containing $ClO_2$ is contacted with an aqueous composition. The clathrate of $ClO_2$ is effective for reducing a microbial count in the aqueous composition by at least about five logarithmic units. The clathrate of $ClO_2$ is effective for providing a concentration of $ClO_2$ in the aqueous composition of at least 0.2 ppm.

A method for treating an aqueous composition, the method includes the step of contacting the aqueous composition with a clathrate of $ClO_2$ and the method effective for reducing a microbial count in the aqueous composition and releasing $ClO_2$.

The clathrate of $ClO_2$ is effective for providing a concentration of $ClO_2$ in the aqueous composition of at least 0.2 ppm and $ClO_2$ gas is released from the clathrate by heating in excess of 37° C. or by dissolution in water or an aqueous containing media. The $ClO_2$ gas can also be released from the clathrate at a water level of at least 0.5 weight percent, based on the weight of the clathrate. The microbial count is generally reduced by five logarithmic units.

The aqueous composition includes water in an industrial cooling process or portable drinking water.

The clathrate of $ClO_2$ is effective for bleaching of the aqueous composition comprising a pulp material.

In another aspect, the formation of $ClO_2$ can be achieved from the reaction of $RClO_2$, wherein R is an ion such as Na, K, Ca or Mg (ionizable), under UV irradiation.

In one aspect, a $RClO_2$ solution is irradiated with a UV source for a time and intensity effective for forming $ClO_2$.

In another aspect, $ClO_2$ is formed by combining a stream of $RClO_2$ and an acid stream in an amount effective for providing an R ion concentration equivalent to an acid concentration, wherein R is Na, K, Ca or Mg. The combined stream is irradiated with a UV source for a time effective for forming $ClO_2$. These methods allow for the production of $ClO_2$ with less equipment and allows for production of $ClO_2$ in small amounts and in batches.

An example of a suitable monosaccharide is glucose. Examples of suitable disaccharide include sucrose, maltose, lactose and mixtures thereof Suitable polysaccharides include for example cellulose, starch and mixtures thereof In an aspect, a clathrate includes at least 25 weight percent organic acid, based on the weight of the clathrate.

In an aspect, clathrate has an organic acid/saccharide blend that is further blended with about 0 to 4 weight percent surfactant, based on the weight of the clathrate. The surfactant may be non-ionic.

In an aspect, clathrate has an organic acid/saccharide blend that is further blended with 0.01 to 3 weight percent EDTA, based on the weight of the clathrate.

In an aspect, a clathrate is coated with a polymer.

In an aspect, clathrate is prepared using a solvent selected from the group consisting of alcohols, ethers, oils and mixtures thereof is added to increase the concentration of $ClO_2$ in the clathrate.

A method for forming a clathrate of $ClO_2$, the method includes the steps of:
  blending at least 25 weight percent organic acid, based on the weight of the clathrate, with a saccharide to form a organic acid/saccharide blend; and
  contacting the organic acid/saccharide blend with a source of $ClO_2$.

A suitable source of $ClO_2$ is $ClO_2$ gas. Suitable sources include for example, a salt of $ClOx$, where x is 1, 2, 3 or 4. The salt may be selected from the group consisting of Na, K, Ca, Mg and mixtures thereof.

In an aspect, a method is effective for providing a clathrate that includes at least 0.1 weight % $ClO_2$, based on the weight of the clathrate. Other ranges include for example, from 0.1 to 10 weight % $ClO_2$, based on the weight of the clathrate or from 0.4 to 3 weight % ClO2, based on the weight of the clathrate.

A saccharide may be selected from a group of monosaccharides, disaccharides, polysaccharides and mixtures thereof and organic acid.

Suitable monosaccharide is selected from glucose, ribose, fructose, galactose, sorbose, tagalose, allose, altrose, mannose, gulose, idose, galactose, talose and mixtures thereof.

In an aspect, a clathrate includes at least 9 weight percent monosaccharide, based on the weight of the clathrate, or from 9 to 74.5 weight % monosaccharide, based on the weight of the clathrate, or from 20 to 70 weight % monosaccharide, based on the weight of the clathrate.

A suitable acid is selected from citric acid, ascorbic acid, lactic acid, tartaric acid, boric acid, lauric acid and mixtures thereof In an aspect, a clathrate includes at least 25 weight percent organic acid, based on the weight of the clathrate, or 25 to 80 weight % organic acid is blended with saccharide and organic acid.

In an aspect, an organic acid/saccharide blend is further blended with 0 to 4 weight percent surfactant, based on the weight of the clathrate. Suitable surfactants include for example, Tergitol or Triton.

In an aspect, an organic acid/saccharide blend is further blended with 0 to 3 weight percent EDTA, based on the weight of the clathrate. In an aspect, clathrate is coated with a polymer. In an aspect, a solvent from a group of absolute alcohols, ethers, oils and mixtures thereof is added to increase the concentration of $ClO_2$ in the clathrate.

In an aspect, a desiccant may be added to the $ClO_2$ to remove water during storage.

A method for treating an aqueous composition, the method includes the steps of contacting the aqueous composition with a clathrate of $ClO_2$, the method effective for reducing a microbial count in the aqueous composition by at least five logs. In an aspect, the clathrate of $ClO_2$ is effective for providing a concentration of $ClO_2$ in the aqueous composition of at least 0.2 ppm.

In an aspect, heating in excess of 37° C. releases $ClO_2$ gas from the clathrate structure or by dissolution in water or an aqueous containing media. For example, $ClO_2$ gas may be released from the clathrate at a water level of at least 0.5 weight percent, based on the weight of the clathrate.

A method for forming a $ClO_2$ includes the steps of:
  irradiating a $xClO_2$ solution with a UV source for a time and intensity effective for forming $ClO_2$, wherein x is Na, K, Ca or Mg; and
  recovering $ClO_2$ with aeration.

In an aspect, the UV irradiation has an intensity of at least 263 nm at 60 microamps at 5000V.

A method for forming $ClO_2$ includes the steps of:
  combining a stream of $RClO_2$ and an acid stream in an amount effective for providing an R ion concentration equivalent to an acid concentration, wherein R is Na, K, Ca or Mg;
  irradiating the streams with a UV source for a time effective for forming $ClO_2$;
  removing the UV source from the streams; and
  recovering $ClO_2$.

In an aspect, UV irradiation is applied for at least one minute and the UV irradiation has an intensity of at least 4,000 microwatts/square centimeter.

DETAILED DESCRIPTION

A clathrate of the present disclosure is formed from the dry blending of a suitable clathrating compound in the presence of $ClO_2$ or a source that releases $ClO_2$, such as chlorite salts. The clathrate acts as a cage or an enclosure which holds the gaseous $ClO_2$ until some external influence acts on its release. The interaction between the molecules in the clathrate may occur via Vanderwalls forces or physical capturing. There is no covalent bonding with $ClO_2$ and other molecules, but rather a weak hydrogen bond may be present. The $ClO_2$ gas is trapped within the clathrate but is not covalently bonded to the structure.

As used herein, "$ClO_2$-clathrate" or "chlorine dioxide containing clathrate" refers to a stable formulation of gaseous chlorine dioxide, wherein the chlorine dioxide (guest) is physically enclosed (or trapped) within an internal space or a cavity formed by a framework of molecules of another kind (host). In the $ClO_2$-clathrates described herein, the $ClO_2$ is substantially present in a gaseous state and may be held by weak, non-ionic, and non-covalent interactions.

In an aspect, the clathrate of the present disclosure is anhydrous. As used herein "anhydrous" refers to being substantially free from water, except for trace impurities and especially water of crystallization; destitute of water, as anhydrous salts of acids. In this aspect, the clathrate has less than about 0.5 weight percent water, based on the weight of the clathrate. In an aspect, the clathrate has less than 0.1 weight percent water, based on the weight of the clathrate or 0.05 weight percent of water.

The clathrates of the present disclosure include $ClO_2$. The $ClO_2$ may be provided in the form of a gas, or may be formed in situ.

In an aspect, in forming a clathrate of the present disclosure, $ClO_2$ gas may be contacted directly with a blend of saccharide to form a clathrate that includes $ClO_2$. $ClO_2$ in the form of a gas may be contacted with a blend of saccharide by bubbling or sparging the $ClO_2$ gas through the saccharide/organic acid blend.

The $ClO_2$ may be provided in the form of a salt of the formula $yClO_x$, where x is 1, 2, 3 or 4, and y is Na, K, Mg, or Ca by reacting with an acid. Any method or composition that provides gaseous $ClO_2$ is suitable for use in producing a clathrate described herein as long as the method or the composition does not substantially affect the formation of clathrate structures.

$ClO_2$ may be manufactured from the reaction of sodium chlorite ($NaClO_2$) with $Cl_2$ (g) via gaseous chlorination or from the reaction of sodium hypochlorite (NaOCl) with HCl and $NaClO_2$. U.S. Pat. Nos. 4,877,500 and 4,874,489, which are hereby incorporated by reference, describe the formation of $ClO_2$ in situ from the reaction of $Cl_2$ and $O_2$ gases with UV radiation. For example, two percent weight/volume (w/v) $Cl_2$ (aqueous) with $O_2$ under UV radiation can also generate $ClO_2$. The alkali metal of $ClO_2$ ($MClO_2$) or MClO can be converted to $ClO_2$ under specified UV conditions. The end product, $ClO_2$, is a yellowish-green, pungent gas with a density 2.4 times that of air. It is water soluble and decomposes under exposure to water, pressure, heat, and noise. When $ClO_2$ comes in contact with water, $HClO_2$ is generated. Typically, when $ClO_2$ is generated, it is used on location without transportation and labeling concerns. $ClO_2$ generated from the UV manufacture disclosed herein is used in the formation of $ClO_2$-clathrates.

$ClO_2$ may be generated from the reaction of $RClO_2$ under UV irradiation. In this aspect, R may be Na, K, Ca, or Mg. In an aspect, R is Na. The reaction of $NaClO_2$ with UV is a reversible method (reaction can proceed to the left or right) when the UV source is not applied or interrupted by failure. In this aspect, UV is applied for a time effective to form $ClO_2$. UV may be applied for at least about one minute. The duration of UV exposure may depend on the depth of the solution or solid that the UV has to penetrate. The reaction is immediate after penetration of the mixture. In an aspect, the intensity of the UV source maybe at least about 4,000 microwatts/square centimeter at one inch, or at least about 20,000 microwatts/square centimeter at one inch. The UV irradiation can also have an intensity of at least 263 nm at 60 microamps at 5000V. The reaction proceeds quickly and is effective to provide a yield of $ClO_2$ of at least about 90%.

The $ClO_2$ can be separated from the water mixture by displacement with a stream of air. This causes the reaction to go to completion or become a nonreversible method. The reaction proceeds to the right under the described aeration conditions.

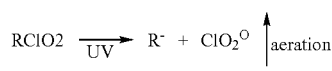

The nonreversal of this reaction can also be eliminated by the addition of an $H^+$ ion concentration equivalent to the $R^+$ ion concentration, with cognizance regarding toxicity of the acid salt formed as well as availability and solubility. Any $H^+$ source can be used, or any organic, inorganic or intermediate chemicals that produce $H^+$ when added to water, such as chlorine. If the UV source fails, the reaction to form $ClO_2$ does not reverse to the original concentrations of $RClO_2$ and $RClO_3^-$.

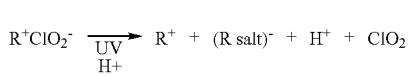

The reaction speed is fast and provides a good source of $ClO_2$ for incorporation into the clathrate.

In an aspect, clathrates are formed from saccharides. The saccharides may be provided initially in the form of monosaccharides, disaccharides, and/or polysaccharides. Examples of monosaccharides useful in the present disclosure include glucose, ribose, fructose, galactose, sorbose, tagalose, allose, altrose, mannose, gulose, idose, talose and mixtures thereof. Example disaccharides useful in the present disclosure include combinations of monosaccharides such as for example sucrose, lactose, maltose and mixtures thereof. Polysaccharides useful in the present disclosure include homopolysaccharides and heteropolysaccharides, for example, cellulose and starch. Where the clathrate is to be utilized in connection with an end product for human consumption, the saccharide may be a food grade saccharide.

In an aspect, an organic acid is useful is producing $ClO_2$ that is further used form the $ClO_2$-clathrates. The organic acid or any suitable acid is used only for the generation of $ClO_2$ and not for the formation of clathrate itself. Organic acids useful in the present disclosure include citric acid, ascorbic acid, lactic acid, phosphoric acid, fumaric acid, malic acid, tartaric acid, acetic acid, proprionic acid, and mixtures thereof. Essentially, these acids must be nontoxic in order to be used for waste water and food applications. Where the clathrate is to be utilized in connection with an end product for human consumption, the organic acid may be a food grade organic acid. A single acid or mixture of acids may be utilized. Other suitable acid includes boric acid.

Other ingredients for clathrate formation include:

EDTA: In an alternative aspect, EDTA (ethylenediamine tetra-acetic acid) may be utilized to form the clathrate. EDTA causes an effective chelation to the structure, which increases its strength and makes the structure larger as compared to clathrates that are not formed with EDTA. In this aspect, from about 0.0 to about 3 weight percent EDTA, based on the weight of the clathrate, is blended with saccharides, for example. EDTA is also be used as a sole source for the formation of clathrates.

Surfactant: In another alternative aspect, a compound that includes hydrophillic and hydrophobic radicals, such as a surfactant, may be utilized to form the clathrate. Examples of surfactants useful in the present disclosure include Triton and Tergitol (Dow Chemicals, Midland, Mich.). The use of a surfactant is effective for increasing the concentration of $ClO_2$ in the clathrate as compared to a clathrate that is not formed with a surfactant. In this aspect, from about 0.0 to about 4 weight percent surfactant, based on the weight of the clathrate, is blended with saccharide, for example. Surfactants also serve as a clathrating compound.

Polymers: Clathrates of the disclosure may be coated with a polymer to protect against water absorption and percussion for support. Examples of useful polymers include water soluble polymers (i.e. polyvinylchloride or polyvinyl acetate (PVA)). Anhydrous polymers may be coated onto the clathrates after their formation. Polymer chains may align, intertwine by forming weak bonds. They may form small capillaries in which gas molecules may be captured or trapped.

Because there is insignificant amount of water, no condensation, polymerization, esterfication, or oxidation reaction takes place. The polymer may not undergo any significant chemical modification as a result of the clathrate formation and gas trapping.

Silica, clay, and Bentonite™ are also useful to form $ClO_2$-clathrates. Bentonite is an absorbent aluminium phyllosilicate generally impure clay consisting mostly of montmorillonite. Two types of bentonites exist: swelling bentonite which is also called sodium bentonite and non-swelling bentonite or calcium bentonite.

Methods for making a clathrate containing $ClO_2$ include the following:

A clathrate of the present disclosure may be made by a method including blending saccharides and contacting the blend saccharides with a source of $ClO_2$. If the source of $ClO_2$ is $NaClO_2$, then a suitable acid such as, an organic acid is blended along with the saccharides and $NaClO_2$, such that $NaClO_2$ releases $ClO_2$ that is trapped inside the spaces formed by a framework of saccharides.

In an aspect, when a saccharide is used for clathrate formation, the $ClO_2$-clathrate is made at temperatures less than 37° C. to reduce the risk of the saccharide melting or changing from a solid (crystalline product) to an amorphous or liquid form. Generally, the colder the mixture, the higher the $ClO_2$ concentration in the final clathrate. The reaction to form the clathrate of the disclosure from $NaClO_2$ and an organic acid is generally described below.

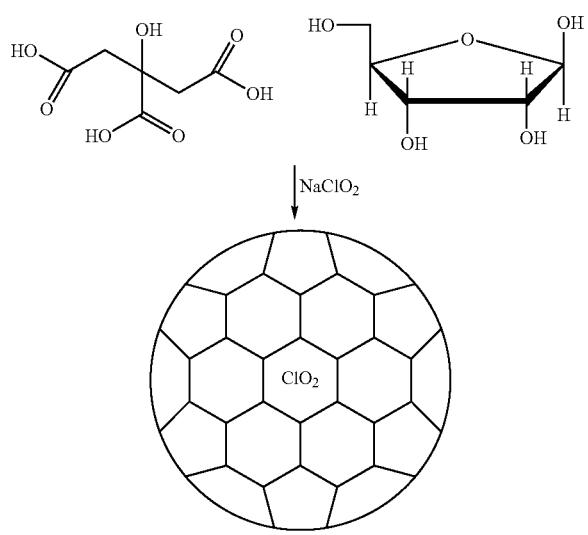

The clathrates of the present disclosure allow for the release of $ClO_2$ gas from the clathrate structure by the following means:
(a) dissolution in water or water-containing media,
(b) heating in excess of 37° C.,
(c) percussion of the crystal by grinding or heavy force,
(d) or a combination of heating and dissolution (hot water).

In a typical use, the dry clathrate containing $ClO_2$ is added to a liquid. The clathrate will begin releasing $ClO_2$ once the water content of the clathrate exceeds about 0.5 weight percent, based on the weight of the clathrate.

A clathrate or a cage-like structure containing chlorine dioxide is formed by a simple dry grinding of a suitable compound such as, for example, Tergitol™ (Nonylphenol Ethoxylates), EDTA, and saccharides with chlorine dioxide or a source material for producing chlorine dioxide, such as, for example, sodium chlorite. Chlorine dioxide gas can also be introduced directly to the mixture.

An organic acid is used to generate chlorine dioxide from a chlorite compound and is not intended for any chemical reaction with saccharides or other clathrate material. One of the chlorine dioxide source materials, for example, sodium chlorite, reacts with an organic acid to generate chlorine dioxide, which is subsequently trapped within the clathrate. In addition, instead of an organic acid, UV radiation can also be used to generate chlorine dioxide from chlorite.

Without bound by a particular theory, it is believed that chlorine dioxide is entrapped within a clathrate through weak forces, e.g., van der Waals forces and/or hydrogen bonding and possibly through non-covalent and non-ionic forces or a combination of these forces.

Without bound by a particular theory, the stability of chlorine dioxide clathrates, unlike other aqueous formulations containing chlorine dioxide (e.g., chlorous acid), is in part, due to the non-aqueous nature of the clathrates of the present disclosure. In the absence of a significant amount of aqueous components, the entrapped chlorine dioxide is stable within the clathrate and does not chemically react with the clathrate. The non-reactive nature of the chlorine dioxide clathrates of the present application is stable over an extended period.

Suitable clathrating compounds such as, saccharides, Tergitol, cellulose, silica, prior to any mixing, possess the ability to capture a molecule like $ClO_2$, likely due to the compound's branched structures or lattice-like structures that form cavities to trap $ClO_2$. No further reaction of the compound is necessary to form a cage-like structure.

Clathrates containing chlorine dioxide, produced by the methods disclosed herein are stable and exist over an extended period of time from several weeks to years.

$ClO_2$-clathrates of the present disclosure do not relate to zeolites containing a chlorite ion.

Certain materials (e.g., clays, minerals, silica) used in the formation of $ClO_2$-clathrates of the present disclosure may act as a diluter to allow the reaction (formation of $ClO_2$) to go forward, and at the same time, prevent the exothermic chain-reaction oxidation that presents as an explosion in a traditional $ClO_2$ production process.

The following examples illustrate methods for carrying out the disclosure and should be understood to be illustrative of, but not limiting upon, the scope of the disclosure which is defined in the appended claims.

EXAMPLES

Example 1

Test Method $ClO_2$ gas is measured spectrophotometrically and compared to standards of $ClO_2$ gas patterns with their wavelength peak at 343 nanometers. The $ClO_2$ gas content is reported in weight percent. The color of the $ClO_2$ clathrate can vary from a yellow to brown to black color depending upon the concentration. The $ClO_2$ concentration can also be determined by colorimetry. The crystals of the $ClO_2$ clathrate can be separated gravimetrically, or by color. The density of the $ClO_2$ clathrate increases as the inclusion body, $ClO_2$, is trapped in the clathrate.

Example 2

Preparation of Clathrate 1.0 gram of citric acid is admixed with 2.0 grams of glucose in a mortar and pestle. The $ClO_2$ gas is generated from the reaction of citric acid with sodium chlorite and is allowed to disperse through the blend. The yellow crystals are aliquoted and tested for $ClO_2$ spectrophotometry over 30 days. The results of this example are shown in Table 1. The level of $ClO_2$ incorporation as a function of time is presented in Table 1.

TABLE 1

| Time | Identification of $ClO_2$* |
|---|---|
| 20 minutes | positive |
| 2 hours | positive |
| 24 hours | positive |
| 48 hours | positive |
| 72 hours | positive |
| 144 hours | positive |
| 10 days | positive |
| 30 days | positive |

*Positive or negative identification of $ClO_2$ by spectrophotometry at 343 nm with expected wave pattern as compared to a control.

Varying concentrations of $ClO_2$ were attempted with a resultant equilibrium of clathrate and citric acid yielding 1.9 weight percent $ClO_2$.

Example 3

Preparation of Clathrate Using EDTA

EDTA (10 grams) and glucose (10 grams) are admixed in a mortar and pestle. Chlorine dioxide ($ClO_2$) gas (adsorbed by the mixture) was added similarly to Example 2. Cellulose can be substituted for glucose yielding similar results. The results of this experiment indicate that the equilibrium of $ClO_2$ to EDTA was consistently less than 0.8 weight percent.

Example 4

Preparation of Clathrate Using Tartaric Acid

EDTA (10 grams), glucose (10 grams) and tartaric acid (5 grams) are admixed in a mortar and pestle. Chlorine dioxide gas was adsorbed by the mixture similarly to Example 2. The results of this experiment and a second trial indicate that the equilibrium of $ClO_2$ to tartaric acid is 0.4-1.2 weight percent.

Example 5

Preparation of Clathrate with Organic Acids

EDTA (10 grams), glucose (10 grams), and one of the following acids, 25 grams boric acid or 30 grams lactic acid, are admixed in a mortar and pestle. Chlorine dioxide gas is adsorbed by the mixture similarly to Example 2. The results of these experiments indicate that the equilibrium of $ClO_2$ to the above acids is 0.08-1.2 weight percent. In the case of lactic acid, a hygroscopic agent such as silica gel is added to absorb the water along with a glucose buffer (10 grams NaCl), followed by the adsorption or until adsorption ceases of $ClO_2$ gas or sodium chlorite at equal weight of acid concentration used.

Table 2 demonstrates the use of different organic acids for $ClO_2$-clathrate formation on a weight percent basis.

TABLE 2

| Organic Acid | $ClO_2$ (weight percent) |
|---|---|
| Citric acid | 1.9 |
| EDTA | 0.08 |
| Tartaric acid | 0.08-1.2 |
| Boric acid, lactic acid, etc. | 0.08-1.2 |

In Examples 2-4, the clathrate is physically separated from the other crystalline material (visual color separation). The crystalline clathrate material is yellow in color. The results of experiments 2-4 based on inclusion of $ClO_2$ are presented in Table 2. The melting point is approximately 153° C., with a water solubility of approximately 60percent at 20° C. The $ClO_2$-clathrate is hygroscopic upon standing.

Example 6

Preparation of the $ClO_2$ Clathrate from a Chlorite and an Organic Acid with Glucose Buffer 0.5 grams of $NaClO_2$ is admixed with 2.0 grams of granulated sugar in a mortar and pestle. 5.0 grams of the monohydrate of citric acid is also added to the above mixture. Upon standing, a crystalline substance is formed and spectrophotometry determined the concentration of $ClO_2$ to be about 1.9 weight percent.

Example 7

Preparation of the $ClO_2$ Clathrate with Surfactant

Tergitol (2-5 grams) and/or Triton 100 (2-5 grams) (long chain lauryl sulfonate compounds) are added to Example 4. The results of this experiment indicate that the equilibrium of $ClO_2$ to EDTA with Tergitol and/or Triton 100 reached 1-3 weight percent. The levels varied as a function of the concentration of Tergitol and/or Triton.

Example 8

Preparation of the $ClO_2$ Clathrate with $NaClO_2$ 1.0 gram of citric acid is admixed with 2.0 grams of glucose in a mortar and pestle. The $ClO_2$ gas in this experiment originates from $NaClO_2$ and HCl which is adjusted to a pH=4.5 with a bicarbonate buffer. This mixture is added to the monosaccharide organic acid mixture. The $ClO_2$ is allowed to disperse through the mixed crystal, while being covered with an expandable membrane. After standing for 30 minutes, the membrane is removed with similar results of $ClO_2$ clathrate production as described in the previous examples. Similar results can be achieved in substituting glucose for cellulose.

Example 9

Preparation of $ClO_2$ with $NaClO_2$ and UV Radiation

A) A solution of 10% $NaClO_2$ by weight is irradiated with UV yielding a solution of 7.8 weight percent $ClO_2$ in water after air displacement and water resorption.

B) A solution of 10% $NaClO_2$ by weight is irradiated with UV. After 20 minutes, the UV is interrupted followed by the sample being capped and refrigerated. The solution contained 70 weight % $NaClO_2$ in water after 15 minutes.

C) A stream of 10% by weight $NaClO_2$ plus a 15% by weight solution of citric acid meet concurrently in a tube containing a UV source. The streams were irradiated for 20 minutes and then interrupted. The samples were capped and refrigerated yielding the results presented in Table 3.

TABLE 3

| Time (hours) | $ClO_2$ (weight percent) |
|---|---|
| 2 | 7.6 |
| 23 | 7.4 |
| 40 | 7.2 |
| 70 | 6.6 |

D) A 10% $NaClO_2$ solution was fed concurrently with a 3% by weight solution of citric acid and irradiated with UV for 20 minutes. The results are presented in Table 4.

TABLE 4

| Time (hours) | $ClO_2$ (weight percent) |
|---|---|
| 1 | 7.6 |
| 2 | 6.1 |
| 6 | 5.0 |
| 24 | 2.0 |

E) A 5% $NaClO_2$ solution was fed concurrently with a 20% by weight solution of citric acid and irradiated with UV for 20 minutes. The results are presented in Table 5.

TABLE 5

| Time (hours) | (Weight percent) |
|---|---|
| 2 | 3.0 $ClO_2$ |
| 2 | 0.4 $OCl^-$ |
| 2 | 0.1 $Cl_2$ |
| 2 | 1.0 Chloramine |
| 6 | 2.0 $ClO_2$ |
| 6 | 1.0 $OCl^-$ |
| 6 | 1.0 Chloramine |

Example 10

Concentration of $ClO_2$ Crystals with the Use of Solvents

The addition of solvents before adsorption or absorption of $ClO_2$ in the clathrate was studied. Methyl alcohol absolute was added to the mixtures described above with the resultant mixtures being air dried having average $ClO_2$ concentration increases as noted in Table 6. The mixtures containing different acids are presented.

TABLE 6

| Acid | Average % Increase |
|---|---|
| Citric acid | 4-7 |
| Lactic acid | 5 |
| EDTA | 3-5 |
| Tartaric acid | 6 |

Ethyl alcohol absolute was substituted for absolute methyl alcohol yielding similar results. The addition of ethers such as ethyl ether or petroleum ether resulted in no appreciable differences. In the case of boric acid with ethyl ether, a reduction of 4-5% $ClO_2$ was noted. Water soluble oils in place of ethers or alcohols yielded an average increase of $ClO_2$ in the clathrate of 5-8%.

Example 11

Addition of Desiccants to $ClO_2$-clathrates

The stability of the $ClO_2$-clathrates is increased by the addition of desiccants to the crystal clathrate. Desiccants aid in the removal of water especially during storage. Five grams of glucose citric acid clathrate is ground in a mortar and pestle with 5 grams of silica gel. The resulting mixture was exposed to different conditions and compared to a 5 gram sample of non-desiccant containing glucose citric acid clathrate. The sample conditions are described in Table 7. The resultant $ClO_2$ clathrate quantities are reported in grams. Comparisons of the samples with and without desiccant are noted below.

TABLE 7

| | Time | | | | |
|---|---|---|---|---|---|
| Condition | 0 | 24 hours | 1 week | 6 weeks | 12 weeks |
| U/A(w/o) | 5 | 5 | 5 | 4.5 | 4.2 |
| U/A(w) | 2.5 | 2.5 | 2.5 | 2.5 | 2.5 |
| U/A/H(w/o) | 5 | 5 | 4.5 | 4.6 | 3.6 |
| U/A/H(w) | 2.5 | 2.5 | 2.5 | 2.5 | 2.5 |
| P(w/o) | 5 | 5 | 5 | 5 | 5 |
| P(w) | 2.5 | 2.5 | 2.5 | 2.5 | 2.5 |
| C(w/o) | 5 | 5 | 5 | 5 | 5 |
| C(w) | 2.5 | 2.5 | 2.5 | 2.5 | 2.5 |

U/A(w/o): uncapped and exposure to air without silica gel
U/A(w): uncapped and exposure to air with silica gel
U/A/H(w/o): U/A and heated to 60° C. without silica gel
U/A/H(w): U/A and heated to 60° C. with silica gel
P(w/o): 25 psi capped without silica gel
P(w): 25 psi capped with silica gel
C(w/o): Cooling to 2.0° C. without silica gel
C(w): Cooling to 2.0° C. with silica gel Example 12

UV-based Production of Chlorine Dioxide from Chlorous Acid and Chloric Acid

The present example relates to methods of using chlorous acid ($HClO_2$) instead of $NaClO_2$ to produce $ClO_2$ gas by UV irradiation. The generated ClO2 is used in the preparation of $ClO_2$-clathrates. The present disclosure also relates to methods of using chloric acid ($HClO_3$) to produce $ClO_2$ gas by UV irradiation.

Chlorine dioxide gas is produced by subjecting a chlorous or a chloric acid solution to ultraviolet radiation. The reaction may be enhanced by the presence of chloride and/or hydrogen ions, and the chloride ion may be acting as a catalyst. Generally undesirable chlorine is not formed significantly by the reaction, which is a commercial and environmental advantage. The yield of chlorine dioxide obtained by exposing the chlorous or chloric acid solution to ultraviolet radiation is a function of the exposure time, the intensity of the radiation and the concentration of chlorous/chloric acid in the solution. Since chlorine dioxide gas at higher concentrations has explosive properties, the above parameters are generally chosen such that the concentration of $ClO_2$ in the reaction mixture does not exceed about 10%. Alternatively, the generated chlorine dioxide gas can be continuously or periodically removed to maintain a desirable concentration in the reaction chamber.

Chlorine dioxide gas is generated following general equations shown below:

  (1)

x and y can be any integer.

  (2)

x and y can be any integer.

The chlorine dioxide generation process is advantageously carried out in situ. The chlorine dioxide formed need not be separated from the reaction mixture, but the entire reaction mixture, including the chlorine dioxide formed, may rather, in most instances, be used as a whole since the other components of the reaction may not exert any detrimental influence on the end uses. Also, the chlorine dioxide containing reaction mixture may be removed from the reaction space and transported to a place of use.

A method of producing chlorine dioxide includes the steps of introducing a solution of chlorous acid or chloric acid into a reaction chamber and subjecting the chlorous acid or chloric acid to ultraviolet radiation. The chlorous acid or chloric acid concentration is from about 0.1% w/v to about 10% w/v. The chlorine dioxide generated is less than about 10% w/v, and the production of chlorine dioxide is performed in situ.

Example 13

ClO$_2$-clathrates from Chlorite, Lauric Acid and UV

The present example relates to methods of using chlorite, lauric acid, and UV. There is a possibility that a condensation reaction may occur upon mixing with chlorite, but the physically soapy, oily structure of lauric acid itself, has the ability to trap ClO$_2$ through polymeric structures (e.g., polymeric tentacles). Thus, lauric acid acts as a chlathrate. Lauric acid is likely to have a lower pH, and the acid may aid in producing the ClO$_2$, but the UV-based production of ClO$_2$ from chlorite is the primary source of ClO$_2$ and the lauric acid acts as a host to trap the nascent ClO$_2$.

Example 14

Treatment of Skin Infections (Fungal and Bacterial) Using ClO$_2$-clathrate

ClO$_2$-clathrates of the present disclosure are useful in treating various infections of the skin. These include onychomycosis, tinea pedis, tinea unguium and tinia capitis.

Onychomycosis, a fungal infection of the finger or toe nails is a common problem that affects many people. Dermatophytes (including the genera Epidermophyton, Microsporum, and Trichophyton) are by far the most common cause of onychomycosis worldwide. This infection may involve any component of the nail unit, including the nail matrix, the nail bed, or the nail plate. The main subtypes of onychomycosis are distal lateral subungual, white superficial, proximal subungual, endonyx, and candidal. Patients may have a combination of these subtypes. The subtypes of onychomycosis may be distinguished on the basis of their usual presenting clinical features.

Distal lateral subungual presents as a thickened and opacified nail plate, nail bed hyperkeratosis, and onycholysis. Discoloration ranges from white to brown. The edge of the involved area is often dystrophic, while the edge of the nail itself becomes severely eroded. Endonyx presents as a milky white discoloration of the nail plate. White superficial is usually confined to the toenails, and it presents as small, white speckled or powdery patches on the surface of the nail plate. The nail becomes roughened and crumbles easily. Proximal subungual presents as an area of leukonychia in the proximal nail fold, and it may extend to deeper layers of the nail. The nail plate becomes white proximally and remains normal distally. *Candidal* infection may involve both the toenails and the fingernails. It can present as an erythematous swelling of the nail fold (paronychia) or as a separation of the nail plate from its bed (onycholysis).

Some of the available topical applications for onychomycosis include Terbinafine (Lamisil), Itraconazole (Sporanox), and Ciclopirox (Penlac). Many of these have side effects and are not effective towards late-stage infections.

ClO$_2$-clathrates of the present disclosure can also be used as a broad-spectrum bactericidal, fungicidal and virucidal agent against various infections. For example, ClO$_2$-clathrates can be used to treat tinea pedis (infection of the foot), tinea unguium (infection of the nails), tinia capitis (infection of the scalp) that involve fungus of the genera: trichophyton, epidermophyton, and microsporum. In addition, ClO$_2$-clathrates can also be used to treat caused by *Cornynebacterium minutissimum*, *Staphylococcal impetigo*, and *Candida* infections.

Bacterial skin infections are caused by bacteria such as *Staphylococcus* species, *Cornynebacterium* spp., *Brevibacterium* spp and *Acinetobacter*. Propionibacteria live in the hair follicles of adult skin and contribute to acne. Some bacteria invade the skin and cause infection and may result in exanthems (rashes). The most common bacteria to cause skin infections are: *Staphylococcus aureus* (folliculitis, furunculosis), *impetigo* (school sores), and staphylococcal scalded skin syndrome. *Streptococcus pyogenes* causes cellulitis, erysipelas, and impetigo. Other bacterial skin infections include cutaneous abscesses, furuncles, hidradenitis suppurativa, carbuncles, paronychial Infections, and erythrasma.

ClO$_2$-clathrates disclosed herein can be used as a topical application to treat toe nail fungus and other infections. Some of the topical formulations include ointments, gels, creams, paste, lotions, and the like. These topical formulations that include ClO$_2$-clathrate are substantially free of water. Some common examples of topical compositions that include water-free constituents include oil-based topical creams, silicone-based topical gels, and other lipophilic components. For example, U.S. Pat. No. 6,740,326 to Meyer et al., (incorporated herein by reference) describes water-free topical application products for the treatment of nail diseases and nail care containing one or more active substances. Water-free oil-based compositions are described in U.S. Pat. No. 6,761,903 to Chen et al., (incorporated herein by reference). Pharmaceutically acceptable adjuvants, carriers, excipients known to those of skill in the art can be formulated with the ClO$_2$-clathrates of the present disclosure to form a topically applicable product for treating skin infections.

The compounds of the disclosure can be formulated for a variety of loads of administration, including systemic and topical or localized administration. Techniques and formulations generally may be found in Remmington's Pharmaceutical Sciences, Meade Publishing Co., Easton, Pa.

Pharmaceutically acceptable carriers include excipients such as binding agents (e.g., starch, polyvinylpyrrolidone or hydroxypropyl methylcellulose); fillers (e.g., lactose, microcrystalline cellulose or calcium hydrogen phosphate); lubricants (e.g., magnesium stearate, talc or silica); disintegrants (e.g., potato starch or sodium starch glycolate); or wetting agents (e.g., sodium lauryl sulphate). By "pharmaceutically acceptable carrier" is meant any carrier, diluent or excipient that is compatible with the other ingredients of the formulation and causes no deleterious effect to the recipient. Liquid preparations for oral administration may take the form of, for example, solutions, syrups or suspensions, or they may be presented as a dry product for constitution with a non-aqueous or aqueous formulations before use. Such liquid preparations may be prepared by conventional means with pharmaceutically acceptable additives such as suspending agents (e.g., sorbitol syrup, cellulose derivatives or hydrogenated edible fats); emulsifying agents (e.g., lecithin or acacia); non-aqueous vehicles (e.g., ationd oil, oily esters, ethyl alcohol or fractionated vegetable oils). The preparations may also contain buffer salts, flavoring, coloring and sweetening agents as appropriate.

The $ClO_2$-clathrates of the present disclosure can be directly applied over the infected area and upon contact with moisture, the $ClO_2$ is released from the clathrate disinfecting the lesions. The amount of $ClO_2$-clathrates applied depends on the infected area, nature of the infection, extent of the infection, and the location of the infection.

The $ClO_2$-clathrate concentration in a topical formulation may range from about 1% by weight to about 10% by weight and from about 10% by weight to about 20% by weight. The $ClO_2$ concentration may range from about 0.01% by weight to about 2% by weight of the topical formulation. An effective $ClO_2$ concentration in a topical formulation to treat topical infection is such that the formulation containing $ClO_2$-clathrate reduces infection in a statistically significant manner. For example, an effective concentration of $ClO_2$ in the $ClO_2$-clathrate can range from about 0.1 weight % $ClO_2$, based on the weight of the clathrate, and in an another aspect, from about 0.4 to about 10 weight % $ClO_2$, based on the weight of the clathrate.

Example 15

Personal Hygiene Applications using $ClO_2$ Clathrate

Halitosis or bad breath is caused by many factors including bacterial growth within the oral cavities of the mouth. For example, Streptococcus salivarius K12 is one of the causative microbes for halitosis. A primary source of breath odor is sulfur-containing gases that emanate from the decomposition of sulfur-amino acids in oral epithelial cells, saliva, blood constituents and food debris in the mouth by bacteria. Hydrogen sulfide and methylmercaptan ($H_2S$ and $CH_3SH$, respectively) are some of the principal odor-causing molecules.

Chlorine dioxide released from the clathrates of the present disclosure oxidizes and deodorizes the reduced compounds ($H_2S$ and $CH_3SH$). Chlorine dioxide as a mouth rinse is effective in oxidizing odoriferous, organic compounds and disinfecting the microbes responsible for bad breath. Mouth washes and oral rinses that use chlorine dioxide released from the clathrates of the present disclosure are capable of treating halitosis.

$ClO_2$-clathrates disclosed herein can be used to treat halitosis. $ClO_2$-clathrates can be formulated to function as an oral rinse or a mouthwash. For example, $ClO_2$-clathrates, in the form of a powder, tablet, gel, or in any other appropriate form can be mixed with an oral rinse or a mouth wash prior to use. An effective concentration of chlorine dioxide in a mouth wash or an oral rinse can be about 10 to about 50 mg per liter. The chlorine dioxide concentration can also be about 15 to about 30 mg per liter of the mouth wash or oral rinse. In an embodiment, the oral rinse or the mouth wash is water mixed with the $ClO_2$-clathrates of the present disclosure. After the $ClO_2$-clathrates dissolve in an aqueous rinse or wash, the chlorine dioxide is released and when applied in the oral cavities, oxidize the odor causing compounds and also eliminate odor causing microbes.

Depending on the nature of bad breath and the extent of halitosis, the concentration of $ClO_2$ trapped in the clathrates, the oral rinse or mouth wash containing $ClO_2$-clathrates can be applied for a few seconds to a few minutes. For example, the oral rinse or mouth wash containing $ClO_2$-clathrates can be applied for about 30 seconds to about 2 minutes. In another embodiment, $ClO_2$-clathrates can be directly applied in the mouth cavities to eliminate bad breath or halitosis.

Tooth staining or discoloration results from both extrinsic and intrinsic staining. $ClO_2$-clathrates of the present disclosure can reduce or eliminate chromogenic staining. Extrinsic staining, mostly due to the accumulation of various chromogenic substances, including chromogen precursors, within the acquired pellicle, can be minimized by applying the $ClO_2$-clathrates disclosed herein. Chlorine dioxide, an oxygenating agent released from the clathrates, can penetrate the tooth enamel to oxidize or solubilize the chromogens. Intrinsic staining occurs as a result of chromogenic substances derived from sources within the tooth and can also be reduced by $ClO_2$-clathrates disclosed herein.

Tooth-whitening compositions that contain $ClO_2$-clathrates disclosed herein can be formulated using know techniques as a liquid, gel, or paste, toothpaste, that render the tooth-whitening by a chemical process while being in contact with the stained tooth surface for a specific period.

In accordance with an embodiment of the present disclosure, relatively low concentrations of chlorine dioxide, preferably in the range of 1 to 500 parts per million (based on total weight of the composition), when contained in or released by tooth whitening compositions, are effective and useful in whitening teeth. Accordingly, appropriate amounts of $ClO_2$-clathrates can be added to release a specific amount of $ClO_2$. The chlorine dioxide contained in the clathrates disclosed herein and released by tooth whitening compositions, when placed in contact with the tooth surface can rapidly oxidize tooth stains, rendering the treated tooth surface relatively whiter after the contact.

Example 16

Chlorine Dioxide Clathrate in Wastewater Treatment

Chlorine dioxide is generally used in waste water treatment mostly for two applications. First, the reduction of H2S either from the waste water or from atmospheric odor. The second use is for the treatment of waste water, prior to discharge, to destroy undesired microorganisms including bacteria, fungus, and viruses without the formation of halogenated organic byproducts. Chlorine dioxide ($ClO_2$) safely oxidizes phenols, cyanides, aldehydes, and mercaptans, reduced sulfur compounds and some pesticides. $ClO_2$ is useful in both wastewater treatment and scrubber systems. $ClO_2$ does not accumulate in the environment and can be used to reduce the growth of troublesome biofilms, iron bacteria, algae and other organisms known to contribute to wastewater and effluent fouling problems. $ClO_2$ can also help reduce effluent surcharges and regulatory fines by reducing Biological Oxygen Demand (BOD) and foul odors in wastewater, without producing chlorinated by-products such as THM and HAA. $ClO_2$-clathrates of the present disclosure can be used to treat wastewater to remove foul odor, to oxidize reactive compounds, to lower the microbial count and to disinfect the treated waste water before being discharged.

Chlorine dioxide released from the $ClO_2$-clathrates of the present disclosure reacts with hydrogen sulfide ($H_2S$) in a theoretical reaction that requires 5 parts $ClO_2$ to 1 part $H_2S$, but the actual industrial usage may be lower. One of the advantages that chlorine dioxide released from the $ClO_2$-clathrates of the present disclosure has over chlorine for waste water disinfection is that $ClO_2$ acts faster than chlorine, generally requires a smaller dose, and is more effective.

$ClO_2$-clathrates of the present disclosure can be added at any stage during the waste water treatments—preliminary or pretreatment, primary treatment, secondary treatment that involves a primary process and a biological treatment stage, or tertiary treatment.

Example 17

Use of $ClO_2$-clathrates in Cooling Towers and in Ammonia Synthesis Plants

The use of chlorine dioxide in cooling towers, heat exchange loops and cooling systems assists in the control of algae, planktonic bacteria, biofilm and scale, helping to maintain the efficiency of heat exchanger surfaces, reservoir intakes, and ancillary equipment. Biofilm acts as an insulator causing deterioration in general heat transfer properties. It creates fouling and corrosion problems by accumulating scale in pipework and equipment. Biofilm also creates an environment that promotes the growth of anaerobic microorganisms which increases microbiologically induced corrosion problems.

Corrosion and microbial growths in an ammonia plants pose a number of problems in industrial water treatment. Ammonia in the cooling water leads to slime outbreaks in ammonia plant cooling systems and results in significant production losses. Chlorine is usually used to control these slime outbreaks, but inevitable result in the formation of toxic chloramines. $ClO_2$-clathrates of the present disclosure can eliminate or reduce these slimes in cooling towers without the formation of toxic chloramines.

Chlorine dioxide-clathrates of the present disclosure provide an alternative to chlorine because $ClO_2$ does not react with the ammonia that is generally present in the cooling system. The $ClO_2$ feed concentration can vary between 0.1 mg/l to about 10 mg/l depending upon the need and the frequency of application can also vary from once a day for about an hour to once a week for a few hours. The $ClO_2$ dosage can also vary from about 10 mg/l to about 100 mg/l depending upon the organic load. Accordingly, appropriate amounts of $ClO_2$-clathrates of the present disclosure can be applied in a continuous mode or in a batch mode. By-products of $ClO_2$-clathrates of the present disclosure can be removed during the water recirculation process.

Residual $ClO_2$ can be measured using standard techniques available to one of ordinary skill in the art. Total microbial counts after the application of $ClO_2$-clathrates can be monitored and the $ClO_2$-feed concentration can be appropriately adjusted if necessary. Calcium levels can be monitored to determine the break-up of slime deposits by $ClO_2$ without an attendant increase in chlorides.

Example 18

Use of $ClO_2$-clathrates in Metal Castings Plants and Vegetable Oil Refineries

Metal castings plant and other metal cutting plants often use recirculating cooling water to serve the mold box cooling needs. A vegetable oil-type mold lubricant is generally applied where the mold comes in direct contact with the cooling water serving the unit. Approximately several pounds/day of this vegetable oil is used and several milligrams or grams of that oil ends up as a contaminant in the recirculating cooling water. This contaminating oil promotes microbial growth, which leads to rubbery slime masses and biofilm scaling and other detriments such as foul odor. Sometimes, the microbial growth requires shut down of the cooling processes to clean the equipment resulting in production loss and additional cost.

Chlorine dioxide released from the $ClO_2$-clathrates of the present disclosure is less likely to react with the contaminating oils than chlorine, and in addition, $ClO_2$ has a wider range of microbial activity, functions at a wide range of pH. The $ClO_2$ feed concentration can vary between 0.01 mg/l to about 1 mg/l depending upon the need and the frequency of application can also vary from once a day for about an hour to once a week for a few hours. The $ClO_2$ dosage can also vary from about 1 mg/l to about 10 mg/l or other higher concentrations, depending upon the organic load. Accordingly, appropriate amounts of $ClO_2$-clathrates of the present disclosure can be applied in a continuous mode or in a batch mode. By-products of $ClO_2$-clathrates of the present disclosure can be removed during the water recirculation process.

Residual $ClO_2$ can be measured using standard techniques available to one of ordinary skill in the art. Total microbial counts after the application of $ClO_2$-clathrates can be monitored and the $ClO_2$-feed concentration can be appropriately adjusted if necessary.

Vegetable oil refineries use a vacuum stripping process that removes the more volatile fractions (components). A condenser is generally attached to the stripping container. Low boiling fractions and, some vegetable oil products spill over into the condenser and contaminate the recirculating cooling water. The contaminating nutrients promote microbial growth and slime deposits build in the cooling system. These microbial growths affect heat exchange surfaces, cause vacuum levels to drop and production rates to decrease. The contaminated recirculating water also overloads the on-site sewage treatment facility.

Chlorine dioxide released from the $ClO_2$-clathrates of the present disclosure is less likely to react with the aliphatic vegetable oil molecule. The $ClO_2$ feed concentration can vary between 0.01 mg/l to about 1 mg/l depending upon the need and the frequency of application can also vary from once a day for about an hour to once a week for a few hours. The $ClO_2$ dosage can also vary from about 1 mg/l to about 10 mg/l or other higher concentrations, depending upon the organic load. Accordingly, appropriate amounts of $ClO_2$-clathrates of the present disclosure can be applied in a continuous mode or in a batch mode. By-products of $ClO_2$-clathrates of the present disclosure can be removed during the water recirculation process.

Example 19

Use of $ClO_2$-clathrates in Bleaching Processes in Various Industries

Chlorine dioxide has been used in bleaching pulp. $ClO_2$'s oxidizing properties, and milder bleaching action compared to chlorine and its ability to improve extraction without producing pitch are suitable for bleaching hardwoods. Because chlorine dioxide is unstable as a gas and is generally stored as a solution of approximately 1% in water, it needs to be generated on-site at the pulp mill. The clathrates of the present disclosure that entrap chlorine dioxide can be used for bleaching purposes as well as for disinfecting applications. Chlorine dioxide released from the clathrates of the present disclosure is reduced by lignin to chlorite ion and hypochlorous acid. The hypochlorous acid reacts with organic materials to form chlorinated organic compounds. The relative concentration of $Cl_2$, HOCl and OCl⁻ is sensitive to pH and careful control of the pH can reduce the formation of organochlorines. The combination of the strong oxidizing capability of $ClO_2$ released from the clathrates of the present disclosure, the reduction in the extent of chlorination, and the changes in lignin, result in an approximately five to ten-fold reduction in the formation of organochlorine compounds when $ClO_2$ as part of a clathrate is substituted for chlorine gas.

The pulp from a bleaching plant usually does not contain a significant amount of microorganisms. For example, a late stage bleaching in kraft mills that use $ClO_2$, generally contains about 50-100 ppm residual $ClO_2$. This concentration of $ClO_2$ is sufficient to sterilize whitewater.

However, after the final bleaching stage, microbial contaminations tend to occur, and it is desirable to minimize or eliminate microbial growth. $ClO_2$-clathrates of the present disclosure capable of providing a residual ClO2 concentration of 0.1 to about 1 ppm, or about 0.5 ppm results in a kill rate of 99% and above within a short period of time. The $ClO_2$-clathrates of the present disclosure can be provided as a continuous dose or in a batch. At this concentration, $ClO_2$ generally does not corrode stainless steel or other metallic containers to a measurable level.

Example 20

Use of $ClO_2$-clathrates in Disinfecting Water for Consumption

As disclosed herein, chlorine dioxide released from the clathrates of the present disclosure is capable of disinfecting aqueous media. Campers, hikers, travelers often do not have access to clean drinking water. Chlorine dioxide is US EPA approved for both the pre-treatment and final disinfection of potable waters. It eliminates microorganisms including *E. coli* and other coliforms, *listeria, Staphylococcus aureus, giardia* cysts, algae, and *salmonella*.

The $ClO_2$-clathrates of the present disclosure in the form of a powder, capsule, tablet, sachet, or any other suitable form can be applied to water prior to consumption. Because chlorine dioxide released from the clathrate acts rapidly (usually in a few minutes), the water is safe for consumption. The $ClO_2$-clathrates of the present disclosure capable of providing about 0.1 to about 0.5 ppm of chlorine dioxide are suitable for disinfecting drinking water systems. The $ClO_2$-clathrates of the present disclosure can also be manufactured to provide a higher $ClO_2$ concentration, such as, for example about 1.0 ppm of $ClO_2$ to disinfect highly contaminated water.

The $ClO_2$-clathrates of the present disclosure can be added to water prior to consumption and the $ClO_2$ is released. About 5-10 minutes later, the disinfection process would be complete and the treated water is suitable for consumption. The ability to store a powerful disinfecting agent ($ClO_2$) in an easy to handle form (tablet or dry powder clathrate) to disinfect aqueous media offer several advantages over conventional disinfecting methods.

Example 21

Miscellaneous use of $ClO_2$-clathrates in Various Industries and Processes

The $ClO_2$-clathrates of the present disclosure can also be used as a disinfecting agent for microbiological control for the food & beverage processing sectors in areas including brewing and bottling, fruit and vegetables, poultry and other meats, fish, and dairy processes, in flume waters, packaging operations and process disinfection.

Example 22

Use of $ClO_2$-clathrates in Bentonite

Bentonite is an absorbent aluminum silicate clay formed from volcanic ash and used in various adhesives, cements, and ceramic fillers and used in drilling mud. Bentonite based products are high-swelling, capable of ion exchange and are used to improve clarity and remove trace metals from wastewater.

$ClO_2$-clathrates of the present disclosure can be mixed with a bentonite product, such as, for example sodium bentonite and the resulting composition can be used for disinfecting in addition to purify wastewater. Bentonite-based water purification products can be obtained from CETCO (Arlington Heights, Ill.), a subsidiary of Amcol International. The clathrate could be added to clay-based (sodium bentonite) dry, chemical flocculants to add the additional benefit of a biocide in addition to cleaning wastewater. $ClO_2$-clathrates of the present disclosure can be mixed with the bentonite to use as a dry biocide.

$ClO_2$ can also be directly combined with a bentonite to form a bentonite-derived $ClO_2$-clathrate.

Numerous modifications and variations in practice of the disclosure are expected to occur to those skilled in the art upon consideration of the foregoing detailed description of the disclosure. Consequently, such modifications and variations are intended to be included within the scope of the following claims.

I claim:

1. An anhydrous clathrate comprising at least 0.1 weight % $ClO_2$, based on the weight of the clathrate; wherein the clathrate is formed from a compound selected from the group consisting of monosaccharides, disaccharides, and polysaccharides wherein said polysaccharides are selected from he group consisting of cellulose, starch and mixtures thereof.

2. The clathrate of claim 1, wherein the clathrate includes from 0.1 to 10 weight % $ClO_2$, based on the weight of the clathrate.

3. The clathrate of claim 1, wherein the clathrate includes from 0.4 to 3 weight % $ClO_2$, based on the weight of the clathrate.

4. The clathrate of claim 1, wherein the monosaccharide is selected from the group consisting of glucose, ribose, fructose, galactose, sorbose, tagalose, allose, altrose, mannose, gulose, idose, galactose, talose and mixtures thereof, and the disaccharide is selected from the group consisting of sucrose, maltose, lactose, and mixtures thereof.

5. The clathrate of claim 1, wherein the clathrate includes at least 9 weight percent monosaccharide, based on the weight of the clathrate.

6. The clathrate of claim 1, wherein the clathrate includes from 9 to 74.5 weight % monosaccharide, based on the weight of the clathrate.

7. The clathrate of claim 6, wherein the clathrate includes from 20 to 70 weight % monosaccharide, based on the weight of the clathrate.

8. The clathrate of claim 1, wherein the clathrate comprising $ClO_2$ is formed as a reaction product of a chlorite and an acid selected from the group consisting of citric acid, ascorbic acid, lactic acid, tartaric acid, boric acid, lauric acid, and mixtures thereof.

9. A stable anhydrous formulation of gaseous chlorine dioxide, wherein the chlorine dioxide is entrapped within an anhydrous clathrate by weak non-ionic and non-covalent interactions; wherein $ClO_2$ is present at a concentration of at least 0.1 weight %, based on the weight of the clathrate; the clathrate is formed from a compound selected from a group consisting of monosaccharides disaccharides, and polysaccharides wherein said polysaccharides are selected from the group consisting of cellulose, starch and mixtures thereof.

10. An anhydrous clathrate comprising from 0.4 to 3 weight % $ClO_2$, based on the weight of the clathrate; wherein the clathrate is formed from a compound selected from the group consisting of monosaccharides and disaccharides.

* * * * *